United States Patent [19]

Zenk

[11] 4,335,171

[45] Jun. 15, 1982

[54] TRANSFER TAPE HAVING ADHESIVE FORMED FROM TWO LAMINAE

[75] Inventor: Robert E. Zenk, River Falls, Wis.

[73] Assignee: Minnesota Mining and Manufacturing Company, Saint Paul, Minn.

[21] Appl. No.: 194,460

[22] Filed: Oct. 6, 1980

[51] Int. Cl.³ .................... A61F 13/02; B32B 27/00; C09U 7/02

[52] U.S. Cl. .................... 428/40; 428/214; 428/216; 428/217; 428/285; 428/286; 428/343; 428/352; 428/354; 428/355; 428/463; 428/511; 428/515; 428/516; 428/914

[58] Field of Search ............... 428/40, 217, 355, 216, 428/913, 914, 220, 214, 215, 343, 352, 285, 286, 354, 463, 511, 515, 516

[56] References Cited

U.S. PATENT DOCUMENTS

| | | | |
|---|---|---|---|
| 2,889,038 | 6/1959 | Kalleberg | 428/220 |
| 4,112,177 | 9/1978 | Salditt et al. | 428/355 X |
| 4,199,645 | 4/1980 | Schwarz | 428/40 X |
| 4,260,659 | 4/1981 | Gobran | 428/217 |

*Primary Examiner*—Thomas J. Herbert, Jr.
*Attorney, Agent, or Firm*—Cruzan Alexander; Donald M. Sell; Richard E. Brink

[57] ABSTRACT

Pressure-sensitive adhesive transfer tape in which the adhesive is a laminate of two physically dissimilar laminae. The product is uniquely adapted to mounting vinyl roofs on automobiles.

4 Claims, No Drawings

TRANSFER TAPE HAVING ADHESIVE FORMED FROM TWO LAMINAE

BACKGROUND OF THE INVENTION

This invention relates to adhesive transfer tape of the type where a normally tacky and pressure-sensitive adhesive is carried by a release liner.

Modern automobiles frequently have what is commonly termed a "vinyl roof", the color and texture providing an asthetically pleasing complement or contrast to the enameled surface of the remainder of the automobile body. The vinyl fabric employed for this purpose typically includes an embossed or otherwise textured vinyl film, to one surface of which a layer of resilient non-woven fibers is bonded with a flexible polymeric foam, e.g., a plasticized polyvinyl chloride. The fibrous layer is adhered to the previously painted roof surface, permitting conformability to surface irregularities and providing a cushion between the vinyl film and the metal top. To prevent moisture from penetrating around the edges of the fabric, the non-woven fiber layer is generally treated with a moisture-repellent fluorochemical polymer.

A considerable amount of work has been carried out to determine the most effective way of adhering a vinyl fabric to an automobile roof. One method involves coating the fibrous layer, the roof, or both with a solution of adhesive, evaporating the solvent, positioning the fabric on the roof, and forcing the adhesive into intimate contact with both the fibrous layer and the roof. Although this procedure is simple, it incorporates a number of problems. For example, evaporation of the solvent requires special equipment, limiting the number of stations in an assembly line at which the vinyl fabric can be applied. In addition, repositioning a fabric which has been inadvertently applied in the wrong place is extremely difficult, and if the adhesive surface of the adhesive-coated fabric comes into contact with itself, it is hard to separate it without adhesive transfer, fabric delamination or distortion.

Manufacturers have also employed so-called "transfer tapes" to attach vinyl fabrics to an automobile roof. Transfer tapes, which have been known to the tape industry for many years, comprise a layer of normally tacky and pressure-sensitive adhesive carried on a release liner, thereby obviating any problem of solvent evaporation. In use, the exposed surface of the adhesive is applied to one substrate, after which the release liner is removed, exposing the opposite surface of the adhesive. The newly exposed adhesive surface is then placed in contact with a second substrate, thereby joining the two substrates. When conventional transfer tapes are used to adhere a vinyl fabric to an automobile roof, the same types of problems arise which exist when a solution of adhesive is applied to the non-woven fiber layers. In other words, if the adhesive adequately penetrates the fiber layer it bonds so quickly to enamel as to preclude repositioning, while if the adhesive initially bonds repositionably to the enamel surface, it is insufficiently conformable to penetrate the non-woven fiber layer, and provide adequate adhesion thereto.

As indicated above, it has been recognized that the type of adhesive which adheres best to the non-woven fibrous layer is not the type which bonds most effectively to an enamel-coated roof. One way to cope with this problem would be to provide a so-called "double-coated" tape in which adhesives having different physical properties are applied to the opposite surfaces of a strip of sheet material; one tape product of this general type is disclosed in Kalleberg U.S. Pat. No. 2,889,038, owned by Applicant's assignee. While such tapes also avoid the necessity of evaporating solvent, they are not only expensive but also, because of the interposed sheet material, increase the effective thickness of the adhesive excessively.

The problem of bonding vinyl fabrics to automobile roofs is further complicated by specifications drawn up by auto manufacturers, requiring that the adhesive employed be storage stable, even at elevated temperatures, capable of bonding firmly to a roof at temperatures ranging from 15° to 35° C., positionable and repositionable within 30 seconds after application without delamination or distortion of the vinyl fabric, readily separable if the adhesive inadvertently contacts itself, and within 72 hours after application displaying a peel strength of at least about 700 grams per centimeter width. Prior to the present invention, it is believed, there has been no satisfactory way to meet these stringent requirements.

BRIEF DESCRIPTION

The present invention provides a means for bonding a vinyl fabric to an enamel-coated automobile roof while still complying with the demanding, and sometimes apparently contradictory, requirements of the automobile manufacturers. The invention provides an improved adhesive transfer tape in which the adhesive layer comprises a laminate of (1) a first lamina of relatively soft pressure-sensitive adhesive, on the order of 50–125 micrometers thick, having an average tack value (as hereinafter defined) of at least about 800 grams per centimeter width. This lamina consists essentially of an isooctyl acrylate:acrylic acid copolymer tackified with a hydrogenated rosin ester or hydrogenated rosin acid, the amount of acrylic acid being in the range of about 3–12% the weight of the copolymer. The pressure-sensitive adhesive layer also includes (2) a second lamina of a relatively firm pressure-sensitive adhesive, on the order of 5–50 micrometers thick, and consisting essentially of a (55–65):(30–40):(3–10) isooctyl acrylate:methyl acrylate:acrylic acid terpolymer. This second adhesive lamina is characterized by low initial peel adhesion (as hereinafter defined) of not more than about 200 grams per centimeter width and ease of separation if inadvertently briefly placed in contact with itself; this adhesive is also characterized by an ability to achieve a high ultimate peel adhesion, greater than 700 grams per centimeter width.

The first lamina of the laminated adhesive is adapted to penetrate and bond to the non-woven fibrous layer of a vinyl fabric, even when that layer has been treated with a fluorochemical to retard penetration of moisture. The second lamina is adapted to bond lightly enough to enameled automobile roof to permit repositioning within 30 seconds after application without delaminating or distorting the vinyl fabric but to bond so firmly to the enameled surface after having been in intimate contact therewith for 72 hours or more that the vinyl fabric cannot be removed without delamination.

It is recognized that others have previously made adhesive tape constructions in which two or more pressure-sensitive adhesive layers having different physical characteristics were successively coated on a backing; see, e.g., Salditt et al U.S. Pat. No. 4,112,177. It is also recognized that, prior to the present invention, transfer tapes had been prepared in which pressure-sensitive adhesive layers having contrasting physical properties were applied to the surface of a release liner; see, e.g., Example 10 of copending Gobran application Ser. No. 49,415, filed June 18, 1979, now U.S. Pat. No. 4,260,659. Both the Salditt et al and Gobran cases are assigned to the assignee of the present applicant. Neither Salditt et al nor Gobran, however, discloses a transfer tape having the unique combination of physical properties required for use in applying a vinyl fabric to an enameled automobile roof.

DEFINITIVE TESTS

Because the physical and functional characteristics of the transfer tape characteristic of the present invention must be determined by means of specified tests, it is believed helpful to define certain of those tests in more detail.

PEEL ADHESION

This test corresponds essentially to the procedure set forth in ASTM Test D-1000, with certain modifications. Solution of the pressure-sensitive adhesive to be evaluated is coated on one face of a primed 25-micrometer biaxially oriented polyethylene terephthalate film and the solvent evaporated to leave an adhesive layer approximately 75 micrometers thick. A 25.4-mm wide strip of the resultant pressure-sensitive adhesive tape is then adhered to a steel panel which has been coated with an automotive enamel such as Fisher Body Paint 980 LDL, and a roller used to insure firm contact between the paint and the panel. One end of the tape strip is doubled back on itself and pulled away to expose a portion of the panel, which is then gripped in the upper jaws of a tensile testing machine, the pulled-away end of the tape strip being gripped in the lower jaws. The jaws are then separated at a rate of 30.5 centimeters per minute, the force required to effect separation being measured at various time intervals. After 30 seconds, the force should not exceed 200 grams per centimeter width, while after 72 hours the force should exceed 1000 g/cm width.

AVERAGE TACK VALUE

This test is essentially the same as the peel adhesion test except that the tape being evaluated is tested against a wide variety of substrates (e.g., stainless steel, aluminum, enamel, glass, polyester, polystyrene and ABS polymers), an average of the several readings being reported. The average tack value measured immediately after application of the tape, should be at least about 800 g/cm width.

DESCRIPTION OF PRESENTLY PREFERRED EMBODIMENTS

Understanding of the invention will be enhanced by reference to the following illustrative but non-limiting example, in which all parts are by weight unless otherwise noted.

EXAMPLE

A kraft paper web, weighing 102 g/m², having a polyethylene coating on each face, a low release silicone coating overlying one polyethylene surface, was obtained. Over the silicone-coating surface there was then applied a solution of a conformable, high tack pressure-sensitive adhesive and the solvent removed in a convection oven to leave an adhesive layer approximately 100 micrometers thick. The adhesive consisted essentially of a 25% solids solution (in 70:30 heptane:isopropanol) of a 95.5:4.5 isooctyl acrylate:acrylic acid copolymer (inherent viscosity approximately 1.5), to which had been added 50% hydrogenated rosin ester (based on copolymer solids). The rosin ester was highly stabilized, having a softening point of 80° C., an acid number of 9, and a specific gravity of 1.07, commercially available from Hercules, Inc. under the trade designation "Foral" 85.

Using a stationary Mayer bar to meter thickness, a solution of a relatively firm pressure-sensitive adhesive was then applied over the dried high tack adhesive coating and the solvent evaporated to leave a dried coating approximately 6 micrometers thick. The adhesive consisted essentially of a 12% solids solution (in 2:1 toluene:ethyl acetate) of a 57.5:37:7.5 isooctyl acrylate:methyl acrylate:acrylic acid terpolymer (inherent viscosity approximately 1.65). The web was then wound convolutely into roll form, a polyethylene film having an intermediate release value silicone coating on one face being wound into the roll with the silicone surface in contact with the last-applied adhesive coating.

When the properties of the firm adhesive were tested according to the peel adhesion test previously described, results were as follows:

| Elaspsed time after applying adhesive to enameled panel, minutes | Peel adhesion, g/cm width |
| --- | --- |
| 0.5 | 180 |
| 1 | 540 |
| 30 | 1,080 |
| 60 | 1,260 |

It will be noted that while the initial adhesion was relatively low (as is appropriate for repositioning a vinyl fabric), it builds to a strong bond within a brief time. When the adhesive-coated face was placed in contact with itself, the tape could be readily separated without distortion of the backing.

When the properties of the soft, compliant adhesive were tested according to the average tack value test previously described, values were found to exceed 800 g/cm width.

To employ the transfer tape of this example to bond vinyl fabric to an automobile roof, the paper-based liner is first removed, exposing the relatively soft, compliant adhesive. This adhesive is then placed in contact with the non-woven fluorochemical-treated fibrous layer of a vinyl fabric of the type used to make vinyl roofs for automobiles. The adhesive is found to penetrate the fibrous layer, surrounding surface fibers and establishing an excellent bond. The remaining polyethylene film release liner possesses sufficient flexibility and extensibility to permit the vinyl fabric to be wound into roll form or otherwise stored until needed, the relatively firm adhesive being meanwhile protected from contamination.

When it is desired to apply the vinyl fabric to an automobile top, the polyethylene film release liner is removed, exposing the relatively firm adhesive. The vinyl fabric is then positioned so that this adhesive contacts an enameled automobile roof and pressed into firm, uniform contact. Within the first few minutes after application, the fabric can be removed and repositioned without adhesive transfer or fabric distortion. Within an hour, however, adhesion has increased significantly, as shown in the preceding test results.

I claim:

1. An adhesive transfer tape particularly adapted for the application of cushioned vinyl fabric to enameled automobile roofs, said fabric comprising a textured vinyl film, a resilient nonwoven synthetic fibrous layer, and a thin layer of polymeric foam bonding said fibrous layer to one face of said film, said transfer tape comprising in combination:

a. a release liner having a low energy surface, to one face of which is removably adhered
   b. a composite laminated pressure-sensitive adhesive layer comprising
      (1) a first lamina of 100 parts by weight of a soft pressure-sensitive adhesive, on the order of 50–125 micrometers thick, having an average tack value of at least about 800 grams per centimeter width, consisting essentially of a 95.5:4.5 isooctyl acrylate:acrylic acid copolymer tackified with about 50 parts by weight of a hydrogenated rosin ester or hydrogenated rosin acid, and
      (2) a second lamina of a firm pressure-sensitive adhesive, on the order of 5–50 micrometers thick, consisting essentially of a 57.5:35:3.5 isooctyl acrylate:methyl acrylate:acrylic acid terpolymer, said adhesive characterized by a low initial tack of not more than about 100 grams per centimeter width and ease of separation when inadvertently briefly placed in contact with itself, but a buildup to a high adhesion level, greater than 700 grams per centimeter width, within 30 minutes after application to an automobile enamel surface, whereby said first lamina is adapted to penetrate and bond to the nonwoven fibrous layer of said vinyl fabric, even when the nonwoven layer has been treated with a fluorochemical to retard the penetration of moisture, and said second lamina is adapted to bond lightly enough to an enameled automobile roof to permit repositioning within 30 seconds after application without delaminating the vinyl fabric but to bond so firmly to such enameled surface after having been in intimate contact therewith for 72 hours or more that the vinyl fabric cannot be removed without delamination.

2. The adhesive transfer tape of claim 1 wherein the first adhesive lamina is about 100 micrometers thick and the second adhesive lamina is about 50 micrometers thick.

3. The adhesive transfer tape of claim 1 or 2 wherein the first adhesive lamina is in contact with a silicone-coated paper release liner and the second adhesive lamina is in contact with a silicone-coated polyolefin film release liner.

4. The adhesive transfer tape of claim 1, 3 or 2 wherein the second adhesive lamina is in contact with the low energy surface of a release liner which is a flexible, conformable polyolefin film and the first adhesive lamina is firmly bonded to the nonwoven fibrous layer of the vinyl fabric, thereby affording an adhesive-coated vinyl fabric which can be easily handled and, upon removal of the release liner, the second adhesive lamina placed in contact with an enameled automobile roof, removed and repositioned as required within 30 seconds, and firmly bonded to said roof by being allowed to remain in position for 72 hours.

* * * * *